United States Patent
Boezen et al.

[11] Patent Number: 5,856,732
[45] Date of Patent: Jan. 5, 1999

[54] SERVOSYSTEM

[75] Inventors: Hendrik Boezen; Jeroen A. Gerlings; Frederik Mostert, all of Nijmegen, Netherlands

[73] Assignee: U.S. Philips Corporation, New York, N.Y.

[21] Appl. No.: 821,631

[22] Filed: Mar. 20, 1997

[30] Foreign Application Priority Data

Apr. 9, 1996 [EP] European Pat. Off. .............. 96200971

[51] Int. Cl.[6] .............................. G05B 1/06; B60Q 1/076
[52] U.S. Cl. .......................... 318/632; 318/563; 318/663; 307/10.8
[58] Field of Search .................................... 318/560, 563, 318/624, 626, 632, 663, 670, 671, 677, 678; 307/10.8

[56] References Cited

U.S. PATENT DOCUMENTS

| | | | |
|---|---|---|---|
| 3,617,847 | 11/1971 | Charlton | 318/616 |
| 3,755,726 | 8/1973 | Knipe et al. | 318/563 |
| 4,506,203 | 3/1985 | Redmond, Jr. | 318/624 |
| 4,549,125 | 10/1985 | Sonobe | 318/663 |
| 4,808,899 | 2/1989 | Swope | 318/619 |
| 5,287,054 | 2/1994 | Llewellyn | 323/314 |

FOREIGN PATENT DOCUMENTS 5-333901A 12/1993 Japan .

*Primary Examiner*—Bentsu Ro
*Attorney, Agent, or Firm*—Robert J. Kraus

[57] ABSTRACT

The servosystem includes adjusting means (1) for changing the position of mechanical element (3), a first transducer (5) for forming an adjusting voltage which is a measure of a desired position of the element, a second transducer (15) for forming a response voltage which is a measure of the actual position of the element, and detection means (13) for forming an error signal (If) which is a measure of a difference between the response voltage and the adjusting voltage. The detection means (13) have a first and a second input (11, 21) which are connected to the first transducer and the second transducer, respectively, and an output (23) which is connected to an input (27) of control means (29) for generating, in dependence on the value of the error signal, a control signal (Vc1, Vc2), for controlling the adjusting means. A compensation resistor (31) is inserted in the connection lead (9) between, for example the first transducer (5) and the input (11) of the detection means (13) connected thereto. The detection means (13) conduct a compensation current through the compensation resistor (31), which compensation current causes a voltage drop across the compensation resistor which is equal to the difference between the response voltage and the adjusting voltage, and form the error signal (If) so that its value is proportional to the value of the compensation current. Consequently, no control signal is applied to the adjusting means (1) if said connection (9) is interrupted.

4 Claims, 2 Drawing Sheets

SERVOSYSTEM

BACKGROUND OF THE INVENTION

The invention relates to a servosystem, including adjusting means for changing the position of a mechanical element, a first transducer for forming an adjusting voltage which is a measure of a desired position of the element, a second transducer for forming a response voltage which is a measure of the actual position of the element, and detection means for forming an error signal which is a measure of a difference between the response voltage and the adjusting voltage, which detection means have a first and a second input which are connected to the first and the second transducer, respectively, and an output which is connected to an input of control means for generating, in dependence on the value of the error signal, a control signal for controlling the adjusting means.

A servosystem of this kind, in which the adjusting means are formed by a motor, is known from the abstract in English of JP-A-5-333 901. Systems of this kind are used to adjust the mechanical element to a desired position which is adjusted, for example manually by means of the first transducer. The first and second transducers may include, for example first and second potentiometers, the first potentiometer being adjustable by way of a rotary knob while the second potentiometer is coupled to the mechanical element so that the setting of the second potentiometer changes when the position of the element changes. In systems of this kind a given distance inherently exists between the first and the second transducer and the detection means, so that comparatively long electrical leads are required for interconnection of these parts. A break in one of these leads could cause an uncontrolled and usually undesirable change of position of the mechanical element. In the known servosystem, therefore, steps are taken to ensure that in the case of a break in the lead between the second transducer and the detection means a simulated response voltage is applied to the second input of the detection means. To this end, the adjusting voltage from the first transducer is inverted and applied as an auxiliary voltage, via a resistor, to the second input of the detection means. The value of said resistor is so high that when the connection between the second transducer and the second input is in order, the auxiliary voltage does not influence the detection means. If said connection is interrupted, the auxiliary voltage is applied to the second input of the detection means instead of the response voltage, so that the error signal has the value zero. In that case the motor will not be activated. This wire breakage protection is based on the assumption that the first transducer is fully operational. Therefore, this method is suitable only for counteracting the adverse effects of a wire break in the connection between the second transducer and the second input of the detection means.

A feasible application of a servosystem of the kind set forth is, for example adjustment of the position of the headlights of a vehicle. Using this system, the light beam is directed so that the light lands on the road at a desired distance from the vehicle. In such an application the first transducer may be situated near the instrument panel of the vehicle and the other parts of the system preferably near the headlights. Another possibility consists in that, for example the first transducer includes one or more sensors which measure the position of the vehicle relative to the road, and an electronic circuit which forms the adjusting voltage from the data supplied by the sensors. The sensors may be arranged, for example to measure the height of the vehicle relative to the road near the front and rear axes. The electronic circuit may include, for example a microprocessor. Generally speaking, in such cases a comparatively long and vulnerable connection lead is required between the first transducer and the detection means or between various parts of the first transducer (in said example between the sensors and the electronic circuit), so that the risk of wire breakage in this lead is comparatively high. Therefore, the known servosystem is not very well suitable for applications of this kind.

SUMMARY OF THE INVENTION

It is an object of the invention to provide a servosystem of the kind set forth which can be protected, as desired, against wire breakage in the connection between the first or the second transducer (or a part thereof) and the relevant input of the detection means. To this end, the servosystem according to the invention is characterized in that between one of the first and second transducers on the one side and the input of the detection means which is connected to the relevant transducer on the other side there is connected a compensation resistor, and that the detection means are arranged to conduct a compensation current through the compensation resistor, said compensation current having such a value that it causes a voltage drop across the compensation resistor which is substantially equal to the difference between the response voltage and the adjusting voltage, and are also arranged to form the error signal in such a manner that the value of the error signal is proportional to the value of the compensation current. If the connection in which the compensation resistor is included, or a connection within the relevant transducer, exhibits an interruption, the compensation current equals zero and hence the error signal is also zero. The adjusting means will not be activated in that case. Should wire breakage occur in the activated state of the adjusting means, the control signal will be interrupted immediately, so that the mechanical element remains in the position occupied at that instant. The compensation resistor can be included in the most vulnerable connection between one of the transducers and the detection means. Generally speaking, this will be the connection to the transducer situated furthest from the detection means. In the above example involving the adjustment of headlights, therefore, this will be the connection to the first transducer which is situated on the instrument panel or includes parts which are spaced far apart.

As stated above, the compensation current causes a voltage drop across the compensation resistor which is equal to the difference between the response voltage and the adjusting voltage. For a given value of this difference, therefore, the compensation current is dependent on the value of the compensation resistor. The relation between the compensation current (and the error signal proportional thereto) on the one hand and said difference on the other hand can thus be defined by a suitable choice of the compensation resistor. This offers the designer an additional degree of freedom which represents an additional advantage of the invention, notably if the detection means themselves are constructed as an integrated circuit (IC).

An embodiment of the servosystem according to the invention is characterized in that the control means include a window comparator which is arranged to compare the error signal with a first and a second reference signal, the absolute value of the first reference signal being smaller than that of the second reference signal, to make the control signal available if the absolute value of the error signal increases beyond the absolute value of the second reference signal, and to interrupt the control signal if the absolute value of the error signal becomes equal to or drops below the absolute value of the first reference signal. This embodiment is particularly suitable for applications in which the mechanical element need not be very accurately adjusted to a predetermined position, but must be positioned within predetermined limits as is the case, for example for said adjustment of headlights. The absolute value of the first reference signal is preferably chosen to be larger than zero, so that it is absolutely certain that no control signal will be generated in the case of an error signal equal to zero.

An embodiment of the servosystem according to the invention is characterized in that the detection means include a differential stage with a current source connected in series with a parallel connection of a first and a second chain which include a main current path of a first and a second input transistor, respectively, a control electrode of the first input transistor being connected to the first input of the detection means and a control electrode of the second input transistor being connected to the second input of the detection means, and that the detection means also include means for forming a first and a second current which are proportional to the difference between the currents in the first and the second chain in order to apply the first current as a compensation current to the first or the second input of the detection means and to apply the second current as an error signal to the output of the detection means. In this embodiment the circuit of the detection means can be comparatively simply implemented as an integrated circuit.

These and other aspects of the invention will be apparent from and elucidated with reference to the embodiments described hereinafter.

DESCRIPTION OF THE PREFERRED
EMBODIMENTS

Figure 1:
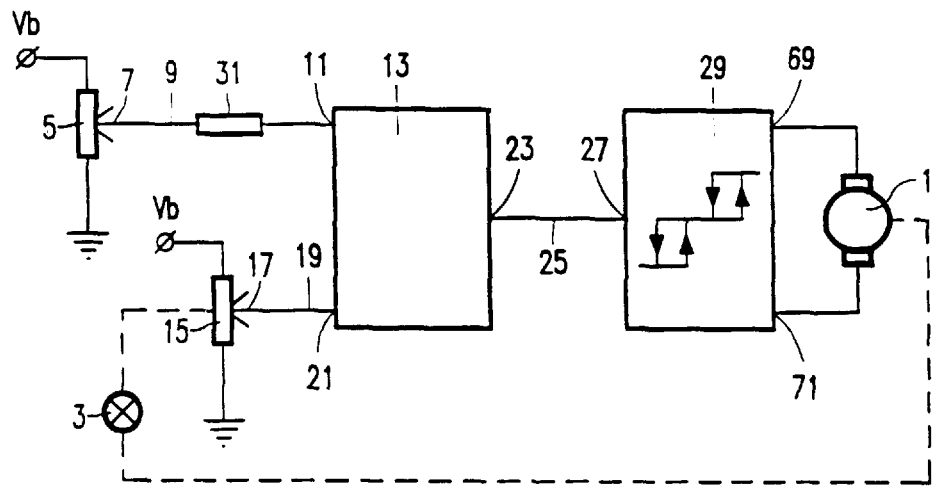
FIG. 1 shows a block diagram of an embodiment of a servosystem according to the invention.

The servosystem shown in FIG. 1 can be used, for example for adjusting the position of the headlights of a vehicle. It includes adjusting means 1 in the form of an electric motor and mechanical elements 3, being the headlights in the present case, which can be adjusted by means of the motor. On the instrument panel of the vehicle there is provided a first potentiometer 5 which constitutes a first transducer. The first potentiometer 5 is connected on the one side to the positive pole of the battery of the vehicle and on the other side to a ground terminal which is connected to the negative pole of the battery. As a result, the battery voltage Vb is present across the first potentiometer 5. The wiper 7 of the first potentiometer 5 can be displaced by means of a knob (not shown) on the instrument panel. An adjusting voltage which is dependent on the position of the knob can be derived from the wiper 7, said adjusting voltage being a measure of a desired position of the headlights. This adjusting voltage is applied, via a first lead 9, to a first input 11 of detection means 13 which will be described in detail hereinafter.

A second transducer is formed by a second potentiometer 15 which is also connected between the positive pole of the battery and the ground terminal. The second potentiometer 15 also includes a wiper 17 which, however, is mechanically coupled to the headlights so that the wiper 17 can deliver a response voltage which is a measure of the actual position of the headlights. The wiper 17 of the second potentiometer 15 is connected, via a second lead 19, to a second input 21 of the detection means 13. The detection means 13 are arranged to form an error signal which is a measure of the difference between the response voltage and the adjusting voltage. The error signal is available on an output 23 of the detection means 13 which is connected, via a third lead 25, to an input 27 of control means 29 which are arranged to generate a control signal for controlling the motor 1. The control means 29 will also be described in detail hereinafter.

In the first lead 9 there is inserted a compensation resistor 31 and the detection means 13 are arranged to generate a compensation current which is conducted through the compensation resistor via the first input 11. The compensation current has a value such that across the compensation resistor 31 it causes a voltage drop which is substantially equal to the difference between the response voltage and the control voltage. This means that the sum of the control voltage and the voltage across the compensation resistor 31 (i.e. the voltage on the first input 11) equals the response voltage present on the second input 21. The detection means thus tend to make the voltage difference between the first input 11 and the second input 21 equal to zero. The error signal on the output 23 is proportional to the value of the compensation current.

Figure 2:
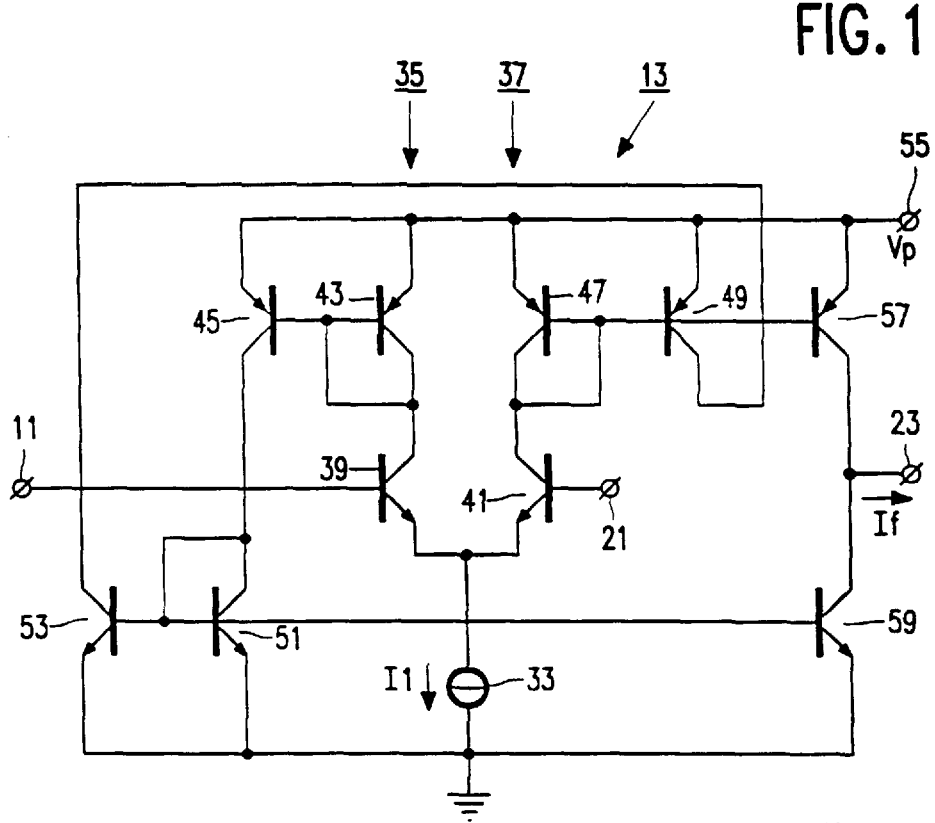
FIG. 2 shows a more detailed diagram of a first part of the system shown in FIG. 1, and FIGS. 3A and 3B show a more detailed diagram of a second part of the system shown in FIG. 1.

FIG. 2 shows a more detailed diagram of an embodiment of the detection means 13. The detection means 13 include a differential stage which is formed by a current source 33 which is arranged to supply a current I1. The current source 33 is connected in series with a parallel connection of a first chain 35 and a second chain 37. The first chain 35 includes the main current path of a first input transistor 39 and the second chain 37 includes the main current path of a second input transistor 41. In the present example, the first and second input transistors 39, 41 are bipolar transistors, like the other transistors used in the detection means (described hereinafter). Evidently, these transistors can be replaced by other types, for example MOSFETs. In the present example, the main current path extends from the collector to the emitter of the two input transistors 39, 41 and the base serves as the control electrode. The base of the first input transistor 39 is connected to the first input 11 of the detection means 13 and the base of the second input transistor 41 is connected to the second input 21. The first chain 35 also includes a transistor 43 which forms a first current mirror in conjunction with a transistor 45 and, analogously, the second chain includes a transistor 47 which constitutes a second current mirror in conjunction with a transistor 49. A transistor 51, constituting a third current mirror in conjunction with a transistor 53, is connected in series with the transistor 45. The circuit is fed by a supply voltage $V_p$ present between a supply connection 55 and ground. As is known, the currents in the two transistors which together constitute a current mirror relate as the magnitudes of the emitter surfaces of said transistors. The current in, for example, the transistor 45 is, therefore, proportional to the current in the transistors 43 and 39, the proportionality factor being determined by the ratio of the emitter surfaces of the transistors 45 and 43. In the simplest case the emitter surfaces of the two transistors of each current mirror are equal, so that said proportionality factor equals 1. If desired, another proportionality factor may be chosen.

The current I1 is distributed between the first and the second chain 35, 37 in dependence on the voltages on the first and second inputs 11, 21. The difference between the currents in the first chain 35 and the second chain 37 is fed back to the first input 11 by means of the first current mirror 43, 45, the third current mirror 51, 53 and the second current mirror 47, 49. This difference current constitutes the compensation current traversing the compensation resistor 31 (see FIG. 1). The compensation current causes a voltage drop across the compensation resistor 31 which compensates the difference between the adjusting voltage (on the wiper 7 of the first potentiometer 5) and the response voltage (on the wiper 17 of the second potentiometer 15), so that the voltages on the first and the second input 11, 21 remain equal. The compensation current value required for this purpose is dependent on the value of the compensation resistor 31. A current If which is proportional to the compensation current can then be used as the error signal for further signal processing. In the simplest case the value of the error signal If equals that of the compensation current. To this end, a 1:1 copy is made of the compensation current, using two output transistors 57 and 59 which copy the current in the second current mirror 47, 49 and that in the third current mirror 51, 53, respectively, and are connected in series. The junction of the output transistors 57, 59 is connected to the output 23 of the detection means 13.

Figure 3A:
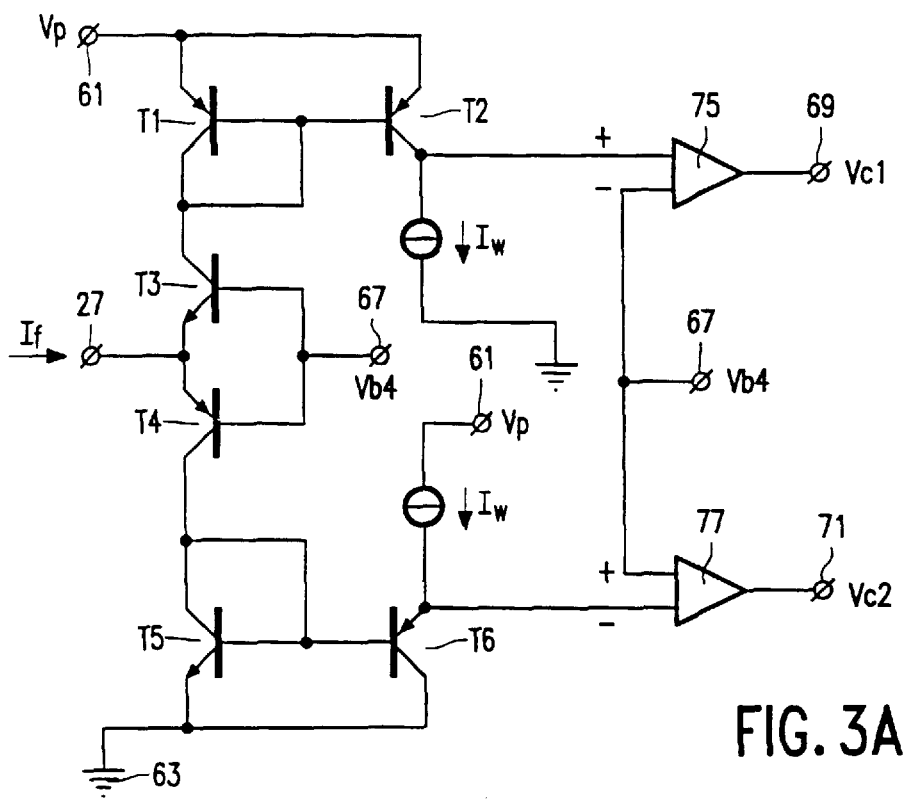
Figure 3B:
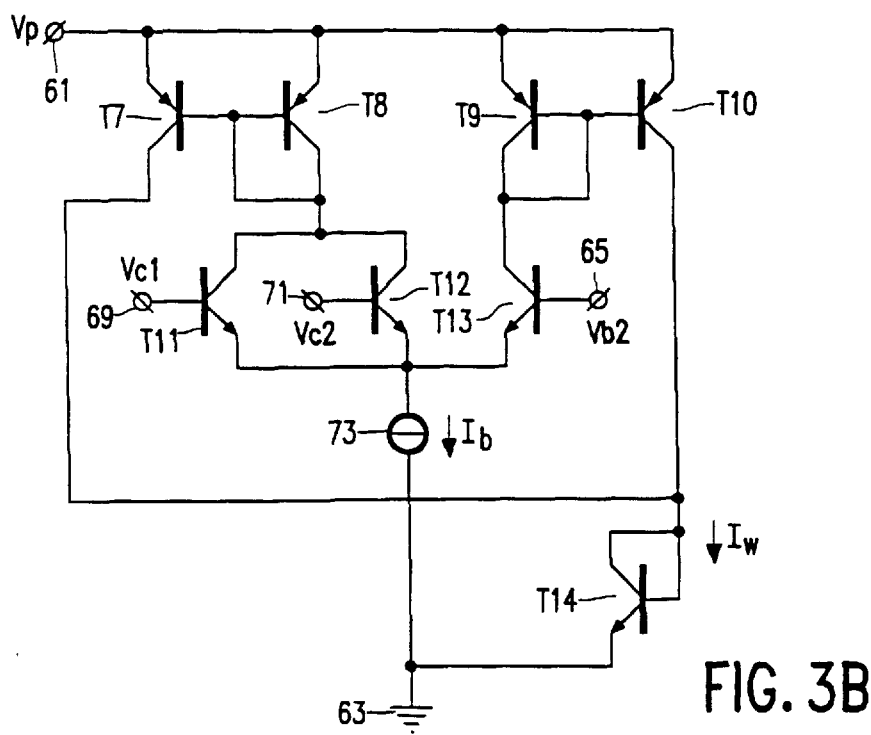

FIGS. 3A and 3B show an embodiment of the control means 29 of the servosystem shown in FIG. 1. The control means in this embodiment include a window comparator which is arranged to compare the error signal formed by the detection means 13 with a first and a second reference signal. The circuit shown comprises two parts which are shown separately in the FIGS. 3A and 3B for the sake of clarity but are actually constructed as one unit, for example as an integrated circuit (IC). The circuit includes a supply terminal 61 and a ground terminal 63 wherebetween a supply voltage $V_p$ can be applied. A first reference voltage Vb2 can be applied via a first reference voltage terminal 65 and a second reference voltage Vb4 can be applied via a second reference voltage terminal 67. The reference 27 denotes the input already mentioned with reference to FIG. 1. This input is connected to the output 23 of the detection means 13 and hence receives the error signal If. The circuit also includes first and second output terminals 69 and 71 on which the control signal for the motor 1 is available. In the present embodiment the control signal may consist of a first control voltage Vc1 for making the motor 1 rotate in one direction or of a second control voltage Vc2 for driving the motor in the other direction. Either the first control voltage Vc1 is then available on the first output terminal 69 or the second control voltage Vc2 on the second output terminal 71.

FIG. 3B shows a part of the circuit which serves to generate a reference current Iw. This part includes a current source 73 which forms part of a comparison stage which includes, connected in a first branch, transistors T11 and T12 whose control electrodes (base terminals) are connected to the first output terminal 69 and the second output terminal 71, respectively, and, connected in a second branch, a transistor T13 whose control electrode is connected to the first reference voltage terminal 65. The first branch is connected in series with a transistor T8 which constitutes a current mirror in conjunction with a transistor T7, and the second branch is connected in series with a transistor T9 which constitutes a current mirror in conjunction with a transistor T10. Each of the transistors T7, T10 is connected to the ground terminal 63 via a transistor T14 which is connected as a diode.

If Vc1 or Vc2 is higher than the first reference voltage Vb2, only the first branch is conductive and hence the current Iw through the transistor T14 is equal to the collector current of T7. If Vc1 as well as Vc2 is lower than Vb2, only the second branch is conductive and hence Iw is equal to the collector current of T10. If the first branch is conductive, the current through T8 equals the current Ib of the current source 73. The current through the collector of T7 then equals Ib times the ratio of the emitter surfaces of T7 and T8. Analogously, if the second branch is conductive, the current through the collector of T10 equals Ib times the ratio of the emitter surfaces of T10 and T9. Thus, the relation between Iw and Ib can be defined by a suitable choice of said ratios of the emitter surfaces.

FIG. 3A shows a part of the circuit which serves to compare the error signal If with the reference current Iw formed in the part shown in FIG. 3B. This part of the circuit comprises a first section (in the upper half of FIG. 3B) and a second section (in the lower half) which are mirror-symmetrical. Each of the two sections includes a transistor, T3, T4, respectively, whose emitter is connected to the input 27 and whose base is connected to the second reference voltage terminal 67. The collector of these transistors is connected to a transistor T1, T5, respectively, which constitutes a current mirror in conjunction with a transistor T2, T6, respectively. The collectors of the transistors T2 and T6 are connected to the part of the circuit which is shown in FIG. 3B and forms the reference current Iw. The first section of the circuit also includes a first comparator 75, a positive input of which is connected to the collector of T2, and the second section includes a second comparator 77 whose negative input is connected to the collector of T6. The negative input of the first comparator 75 and the positive input of the second comparator 77 are connected to the second reference terminal 67. All transistors in the present embodiment are bipolar transistors, corresponding transistors in the first and the second section of the part of the circuit shown in FIG. 3A being of opposite polarity. Another implementation, for example utilizing MOS transistors, is also feasible.

The operation of the part of the circuit shown in FIG. 3A is as follows: if the error signal If equals zero, the collector current of T2 and T6 is also zero. As a result, the first comparator 75 carries a voltage zero on its positive input and its negative input carries a voltage Vb4 which is greater than zero. The output voltage, constituting the first control voltage Vc1, is then low (<Vb2). The second comparator 77 carries the voltage Vb4 (>0) on its positive input and the voltage Vb (>Vb4) on its negative input. Therefore, the second control voltage Vc2 is also low.

If the error signal If is positive, If is mirrored to the collector of T6 via T4 and T5. As soon as If becomes greater than the Iw prevailing at that instant, the voltage on the negative input of the second comparator 77 will decrease significantly and become smaller than Vb4. As a result, the second control voltage Vc2 will become high (>Vb2). As a first consequence thereof, the first branch (i.e. T12) in the part of the circuit shown in FIG. 3B will become conductive and hence Iw will be changed (reduced). As a second consequence, the motor 1 will start to rotate such that, via the control system described with reference to FIGS. 1 and 2, the value of If is reduced until If becomes smaller than the new value of Iw. At that instant the negative input of the second comparator 77 becomes high again (>Vb4) and the comparator returns to its original state in which the second control voltage Vc2 is low, so that the motor 1 stops. If If is smaller than zero, a similar consideration holds for the first section of the part of the circuit which is shown in FIG. 3A, the signal path then extending via T3, T1, T2 and the first comparator 75.

It appears from the foregoing that the direction of rotation of the motor 1 is determined from the polarity of the error signal (the direction of the current If) by means of T3 and T4. Therefore, it can never occur that the first control voltage Vc1 and the second control voltage Vc2 are simultaneously present. Consequently, the control signal equals Vc1 or Vc2 or zero.

As appears from the foregoing description of the operation of the circuit, Iw can assume two values which constitute a first reference signal and a second reference signal, respectively, with which the error signal If is compared. Because this comparison takes place, in dependence on the direction of If, in the first or in the second section of FIG. 3A, the absolute value of If is always compared with the absolute value of Iw. The current Ib, being co-decisive in respect of the two values of Iw, is related to the supply voltage $V_p$. Consequently, the overall system has a hysteresis window which is a percentage of the supply voltage. For example, if the emitter surface of T9 is chosen to be equal to that of T10, Iw equals Ib if the motor 1 does not rotate. If the emitter surface of T8 is chosen to be four times larger than that of T7, Iw equals one quarter of Ib if the motor rotates in one of the two feasible directions. Consequently, the size of the window can be readily chosen by way of a suitable choice of the ratios of said emitter surfaces. Preferably, the lowest absolute value of Iw is chosen to be larger than zero in order to make absolutely certain that the motor 1 will not rotate if If equals zero, for example due to wire breakage in the lead 9 between the first potentiometer 5 and the first input 11 of the detection means 13 (FIG. 1). If the lowest value of Iw is chosen to be equal to zero, for example, interference voltages occurring in the system could, at least in theory, cause the formation of a control voltage Vc1 or Vc2.

We claim:

1. A servosystem, including adjusting means (1) for changing the position of a mechanical element (3), a first transducer (5) for forming an adjusting voltage which is a measure of a desired position of the element, a second transducer (15) for forming a response voltage which is a measure, of the actual position of the element, and detection means (13) for forming an error signal (If) which is a measure of a difference between the response voltage and the adjusting voltage, which detection means have a first and a second input (11, 21) which are connected to the first and the second transducer, respectively, and an output (23) which is connected to an input (27) of control means (29) for generating, in dependence on the value of the error signal, a control signal (Vc1, Vc2) for controlling the adjusting means, characterized in that between one of the first and second transducers (5, 15) on the one side and the input (11, 21) of the detection means (13) which is connected to the relevant transducer on the other side there is connected a compensation resistor (31), and that the detection means are arranged to conduct a compensation current through the compensation resistor, said compensation current having such a value such that it causes a voltage drop across the compensation resistor which is substantially equal to the difference between the response voltage and the adjusting voltage, and are also arranged to form the error signal (If) in such a manner that the value of the error signal is proportional to the value of the compensation current.

2. A servosystem as claimed in claim 1, characterized in that the control means (29) include a window comparator which is arranged to compare the error signal (If) with a first and a second reference signal (Iw), the absolute value of the first reference signal being smaller than that of the second reference signal, to make the control signal (Vc1, Vc2) available if the absolute value of the error signal increases beyond the absolute value of the second reference signal, and to interrupt the control signal if the absolute value of the error signal becomes equal to or drops below the absolute value of the first reference signal.

3. A servosystem as claimed in claim 2, characterized in that the absolute value of the first reference signal (Iw) is larger than zero.

4. A servosystem as claimed in claim 1, characterized in that the detection means (13) include a differential stage with a current source (33) connected in series with a parallel connection of a first and a second chain which include a main current path of a first and a second input transistor (39, 41), respectively, a control electrode of the first input transistor being connected to the first input (11) of the detection means and a control electrode of the second input transistor being connected to the second input (21) of the detection means, and that the detection means also include means for forming a first and a second current which are proportional to the difference between the currents in the first and the second chain in order to apply the first current as a compensation current to the first or the second input of the detection means and to apply the second current as the error signal (If) to the output of the detection means.

* * * * *